United States Patent [19]

Grover et al.

[11] 4,433,829

[45] Feb. 28, 1984

[54] LOG RAISER

[76] Inventors: Mark D. Grover, 1700 Spanish Canyon; Thomas C. Shaffer, 2600 Boonville Rd., both of Ukiah, Calif. 95482

[21] Appl. No.: 401,941

[22] Filed: Jul. 26, 1982

[51] Int. Cl.³ .............................................. B65G 7/12
[52] U.S. Cl. ..................................... 254/131; 294/17
[58] Field of Search ................. 254/131, 94; 269/204, 269/197, 236, 296, 239; 294/17, 104

[56] References Cited

U.S. PATENT DOCUMENTS

| | | | |
|---|---|---|---|
| 534,703 | 2/1895 | Thomas | 294/17 |
| 867,630 | 10/1907 | Wood | 294/17 |
| 1,493,114 | 5/1924 | Hodge et al. | 294/17 |
| 1,635,291 | 7/1927 | Smith et al. | 254/94 |
| 4,087,077 | 5/1978 | Vance | 254/94 |

Primary Examiner—Robert C. Watson
Attorney, Agent, or Firm—Thomas R. Berthold

[57] ABSTRACT

A log raiser for gripping a log and supporting it above ground for easy cutting. A toothed claw locks the log against a pair of rods with ridges and a lever arm extending outwardly from the rods is moved from an upright position into contact with the ground to rotate the gripped log so that it is supported above ground by means of a pair of trusses which are attached to the rods.

2 Claims, 2 Drawing Figures

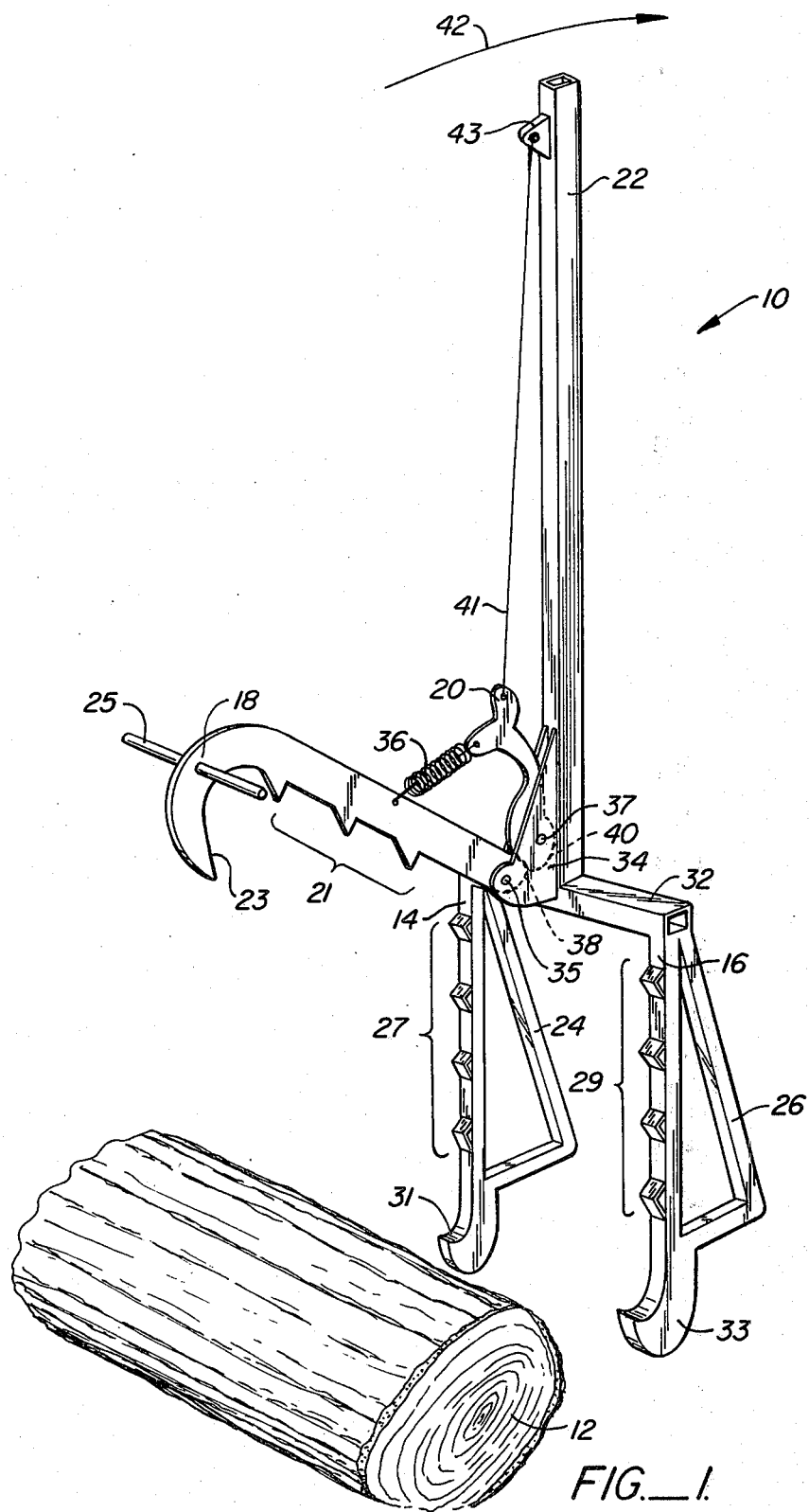
FIG._1.

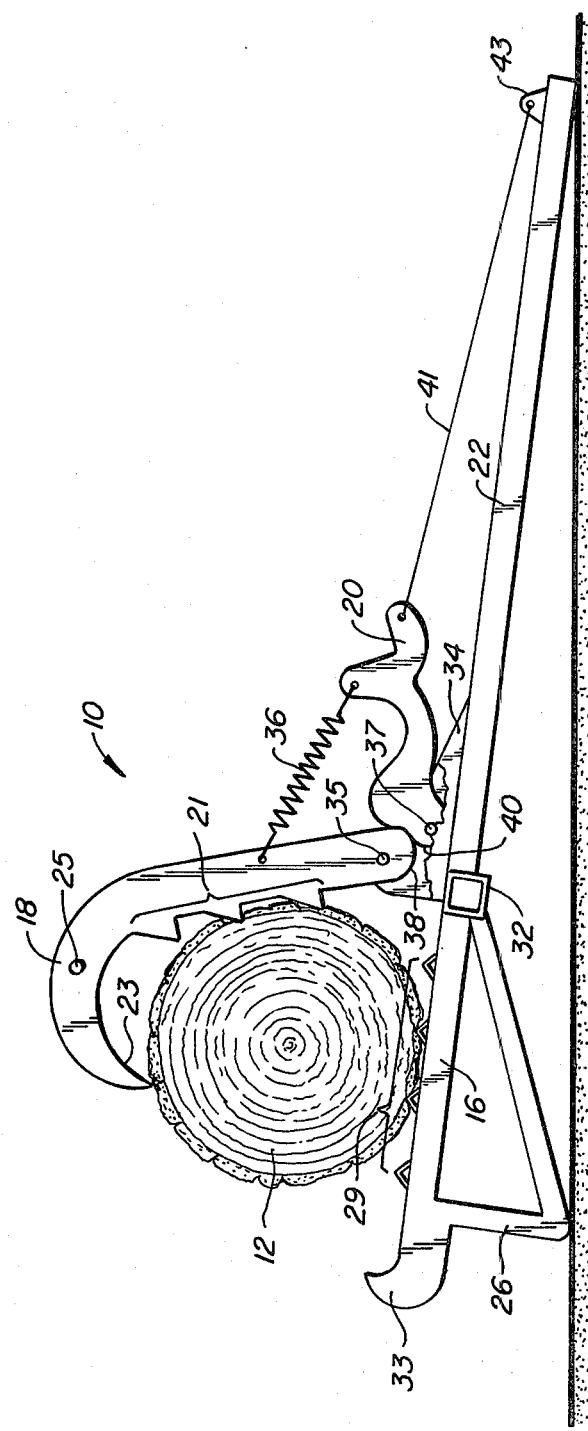
FIG._2.

LOG RAISER

BACKGROUND OF THE INVENTION

This invention relates to log gripping devices and more particularly to a device for gripping and supporting a log above ground to facilitate its cutting. When it is desired to cut logs or bundles of branches into fireplace-length segments, it is usually necessary to support at least one end of the log or bundle so that the saw can pass completely through. In the case of a log, this is usually accomplished by rolling the log up on a rock or branch for support during the cutting. Often, a cant hook, such as that disclosed in U.S. Pat. No. 392,752 to Rankins, is used to roll the log.

SUMMARY OF THE INVENTION

The present invention is a log raiser for securely gripping a log, and, after it has been gripped, for supporting it raised above the ground so that it can be cut into fireplace-length segments. The log raiser includes means for securely gripping the log and a lever arm extending outwardly from the gripping means. A log supporting means is located near the gripping end so that after the log has been gripped and then rotated by the lever arm it is supported in a raised position above ground for easy cutting. The supporting means is a pair of spaced-apart trusses which allow the log, if it is gripped generally at the midpoint of its length, to be supported so that both of its ends are raised above the ground. In this manner, workers can cut fireplace-length segments off both ends of the log at the same time.

For a fuller understanding of the nature and advantages of the present invention, reference should be made to the following detailed description taken in conjunction with the accompanying drawings.

BRIEF DESCRIPTION OF THE DRAWINGS

FIG. 1 is a perspective view of the log raiser in the upright position with the gripping means in the open or unlocked position; and FIG. 2 is a side view of the log raiser with the gripping means locked on the log and the lever arm rotated so that the log is supported above the ground for cutting.

DESCRIPTION OF THE PREFERRED EMBODIMENTS

Referring first to FIG. 1, the log raiser 10 is illustrated in its upright position next to and above a typical log 12 which is lying on the ground. The log raiser comprises generally a pair of parallel spaced-apart rods 14, 16 for contacting the outer periphery of the log, a claw 18 for holding the log securely against the rods, a locking arm 20 for locking the claw into position against the log, a lever arm 22 which extends outwardly from the rods, and means such as trusses 24,26 for supporting the log above the ground after the lever arm 22 has rotated the gripped log (FIG. 2).

The rods 14, 16 include a plurality of ridges 27, 29 along their length and hooks 31, 33 at their ends. The ridges assist in gripping the log and the hooks maintain the log within the grip of the log holder when the log holder is rotated in the manner described below. Each of the rods 14, 16 is attached at its end to a cross member 32, which is connected at its midpoint to the end of lever arm 22. Connected to lever arm 22 near its point of attachment to cross member 32 is a bracket 34 which provides rotatable mountings for the claw 18 and the locking arm 20.

Claw 18 for holding the log against the ridges 27, 29 of rods 14, 16 includes a plurality of teeth 21 along its length, a hook 23 at its end, and a handle 25. The ends of claw 18 and locking arm 20 near their respective points of hinged connection or rotatable mounting 35,37, respectively, to bracket 34 have a generally circular perimeter, as illustrated in FIG. 1 by numerals 38,40, respectively. However, both claw 18 and locking arm 20 are mounted off-center for hinged connection to bracket 34 so that the outer perimeters define generally eccentric surfaces, 38, 40. Claw 18 and locking arm 20 are connected to one another by means of a spring 36 so that their respective eccentric surfaces, i.e. surface 38 on claw 18 and surface 40 on locking arm 20, are always maintained in contact with one another. A trip wire 41 is connected between locking arm 20 and a bracket 43 located on the end of lever arm 22.

The invention can be better understood by considering the function of the above-described component parts when the log raiser is in operation. As shown in FIG. 1, the log raiser 10 is in position just prior to gripping the log to be raised. The log raiser 10 is generally supported in its upright position on the ground by means of the lower parts of trusses 24,26 and the hooks 31,33. The log raiser is moved so that the ridges on rods 14,16 are in contact with the outer periphery of the log 12. The claw 18 is then rotated downward, either manually or by stepping on handle 25, until its teeth 21 engage the outer periphery of log 12 so that the log 12 is now gripped between claw 18 and the log contacting members or rods 14, 16. Because the claw 18 and locking arm 20 are connected by means of spring 36, the rotation of claw 18 into contact with the log 12 also causes a like downward rotation of locking arm 20. As the simultaneous rotation of claw 18 and locking arm 20 occurs, the respective eccentric surfaces 38,40 are maintained in contact with one another. After claw 18 is moved into contact with log 12 it is maintained or locked into that position by means of locking arm 20. This locking occurs because any attempt to rotate claw 18 back upward (clockwise in FIG. 1) and out of contact with log 12 would, because the eccentric surfaces 38, 40 are in contact with one another, tend to cause locking arm 20 to rotate downward (counterclockwise in FIG. 1). However, such rotation of locking arm 20 is prevented because the distance between the rotatable connection points 35 and 37 on bracket 34 is fixed. When claw 18 is locked against log 12, locking arm 20 may rotate only upward (clockwise in FIG. 1) because such rotation would tend to move a portion of eccentric perimeter 40 which has a lesser radius from point 37 into contact with surface 38. Thus, the two surfaces, 38, 40 "bind" together as locking arm 18 is attempted to be moved upward and away from log 12.

After claw 18 has been locked against log 12, the log raiser 10 is then rotated, in the direction shown by arrow 42 in FIG. 1, until lever arm 22 is in contact with the ground, as shown in FIG. 2. It should be noted that the direction of slope of teeth 21 on claw 18 permit the weight of log 12 to be supported on teeth 21 as the log is rotated and raised above ground. Likewise, the hooks 31 and 33 on the ends of rods 14, 16 also prevent the loss of grip of log 12 during rotation. The hook 23 on claw 18 also prevents the loss of grip of log 12 during rotation, but also permits the log raiser to grip a bundle of small branches and twigs, which might otherwise fall from the gripping action of claw 18 when the log raiser 10 is rotated to raise the bundle above the ground.

After the log 12 has been rotated so that the end of lever arm 22 is in contact with the ground (FIG. 2), it is supported by means of trusses 24, 26 and raised above the ground for easy cutting. The log remains locked by the above-described function of claw 18 and locking arm 20. Moreover, because the log raiser 10 includes a pair of spaced-apart trusses 24, 26, the log can be gripped substantially at the midpoint of its length and raised so that both ends are above ground to permit cutting of fireplace-length segments from both ends at the same time. After the log 12 has been cut, the remaining segment is released by moving locking arm 20, either manually or by stepping on trip wire 41, so that it rotates in a direction away from the log 12 (clockwise in FIG. 2). Such rotation tends to move a portion of eccentric surface 38 of a lesser radius from point 37 into contact with surface 40 or claw 18. As the locking arm 20 is so rotated, usually by a worker stepping on the outer end of locking arm 20, the law 18 is rotated in the same direction because it is connected to locking arm 20 by means of spring 36. Thus, the clockwise movement of locking arm 20 simultaneously frees claw 18 for like movement and causes the claw 18 to move away from log 12. The interaction of claw 18 and locking arm 20 and the design of their repective eccentric surfaces permits claw 18 to be locked at any point between its open and closed positions so that logs of virtually any diameter can be gripped by the log raiser. This locking mechanism is the preferred embodiment of the present invention, but other types of locking mechanisms, such as a ratchet device, would also allow claw 18 to be locked at a number of positions to accommodate logs of various diameters.

While the preferred embodiments of the present invention have been illustrated in detail, it should be apparent that modifications and adaptations to the embodiments will occur to those skilled in the art. It is to be expressly understood that such modifications and adaptations are within the sphere and scope of the present invention as set forth in the following claims.

What is claimed is:

1. An apparatus for raising a log above ground to facilitate its cutting comprising:
   means for contacting the log along a portion of its outer periphery;
   a lever arm extending outwardly from said log contacting means;
   a hinged claw connected to the lever arm for holding the log against said log contacting means, said claw having means near its hinged connection to the lever arm defining a generally eccentric surface;
   means for locking the claw against the log, said claw locking means being rotatably connected to the lever arm and having a generally like eccentric surface for interlocking engagement with the eccentric surface of said claw;
   means for connecting said claw to said claw locking means, whereby when said claw is locked against the log the eccentric surface of said claw locking means is moved into contact with the eccentric surface of said claw and movement of said claw away from the log is substantially prevented; and
   means attached to said log contacting means for supporting the log above the ground after the gripped log has been rotated by the lever arm.

2. An apparatus for raising a log above ground to facilitate its cutting comprising:
   means for contacting the log along a portion of its outer surface;
   a lever arm extending outwardly from the log contacting means;
   a claw hinged to the lever arm and having teeth for engaging the log, said claw having a generally eccentric surface near its hinged connection to the lever arm;
   means connected to the lever arm for locking the claw against the log, said locking means having an eccentric surface generally like that of the claw for interlocking with the eccentric surface of said claw; and
   means connected to the lever arm for supporting the gripped log above the ground after the lever arm has rotated the gripped log sufficiently to place the supporting means in contact with the ground.

* * * * *